(12) United States Patent  
Corbett, Jr. et al.

(10) Patent No.: US 6,879,065 B2  
(45) Date of Patent: Apr. 12, 2005

(54) LINEAR ACTUATOR

(75) Inventors: Jesse Vernon Corbett, Jr., Clayton, NC (US); Richard Hunter Harris, Raleigh, NC (US); Mark Leland Myers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 10/633,953

(22) Filed: Aug. 4, 2003

(65) Prior Publication Data

US 2004/0070287 A1 Apr. 15, 2004

Related U.S. Application Data

(63) Continuation of application No. 09/829,888, filed on Apr. 10, 2001, now Pat. No. 6,734,582.

(51) Int. Cl.[7] .......................... H02K 41/00; H02K 43/00
(52) U.S. Cl. ............................. 310/12; 310/20; 310/21; 310/29; 310/27; 74/89.37; 74/89.38; 74/89.41; 192/141; 192/143
(58) Field of Search .............................. 310/12, 20, 21, 310/27, 29; 74/89.37, 89.38, 89.41; 192/141, 143

(56) References Cited

U.S. PATENT DOCUMENTS 5,809,833 A * 9/1998 Newport et al. ........... 74/89.37
6,259,175 B1 * 7/2001 Alfano et al. ................. 310/20

* cited by examiner

*Primary Examiner*—Tran Nguyen
(74) *Attorney, Agent, or Firm*—Jeanine S. Ray-Yarletts

(57) ABSTRACT

An improved linear actuator incorporates a DC motor whose stator is secured to a frame is provided for. To improve operational longevity and reliability of a linear actuator, the improved actuator includes a retention clutch and an axial load limiter. An axially configured retention clutch is configured to slidably fit within the open inner channel diameter of an axial load limiter and over a motor shaft of a linear actuator. In operation, the retention clutch reduces the impact loads on the stop and extending the fatigue life of these wearable components. Similarly, when the screw encounters axial loads during operation, these loads are distributed across both the axial load limiter and the motor, thereby reducing direct forces on the motor and contributing to an extended use of the motor component.

20 Claims, 4 Drawing Sheets

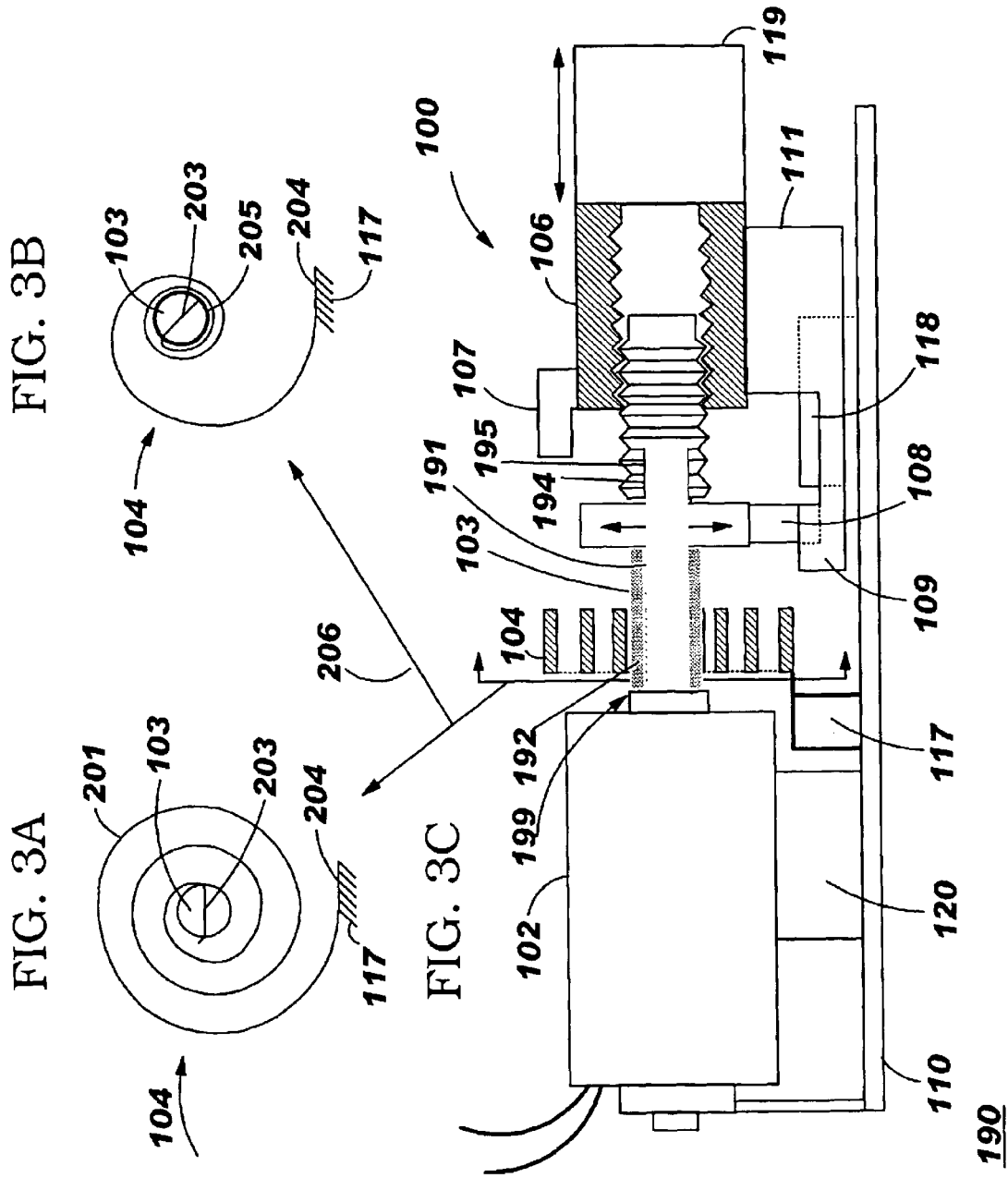

LINEAR ACTUATOR

CROSS-REFERENCE TO RELATED APPLICATIONS

This is a continuation-in-part of co-pending application Ser. No. 09/829,888, filed on Apr. 10, 2001 now U.S. Pat. No. 6,734,582, the teachings of which are incorporated herein by reference.

TECHNICAL FIELD

The present invention relates in general to electromechanical devices, and in particular to linear motion actuators.

BACKGROUND INFORMATION

Soleniods are traditionally used to actuate mechanisms by the application of a voltage to an electromagnetic coil. Solenoids are expensive and require considerable design effort to ensure that the mechanical load requirements are consistent with the available force profile of the solenoid. This can be particularly challenging since the solenoid provides less force near the beginning of its stroke and provides exponentially more force as the stroke reaches the end of its travel. Solenoids suffer reliability problems because magnetic flux must bridge the plunger's sliding bearing and residual magnetic spacer of close tolerance must prevent the plunger from magnetically sticking to the pole face. If either of these design parameters becomes too marginal, the solenoid performance is radically altered.

Linear actuators have been designed where a motor drives a threaded shaft and a corresponding threadedly coupled nut. The nut translates laterally when prevented from rotating by a guiding surface. The motor may be driven in one direction to emulate the drive stroke of a solenoid and driven in the other direction to return the nut and an attached actuator means to a home position. To define the stroke of the motor driven linear actuator, axial stops have been used which may generate thrust loads in the extended or retracted position. To eliminate driving the motor in both directions, a torsion spring has been used with the appropriate thread design to enable the torsion spring to rotate the shaft and translate the nut to a home position. Axial loads may cause motor damage or the threads to bind and thrust return springs, besides causing axial loads, put severe restrictions on the design of the threads to allow a non powered return of an extended actuator.

Co-pending patent application Ser. No. 09/829,888 sets forth, in part: an electrically driven linear actuator device that has neither a sliding bearing nor a requirement for a magnetic residual; a linear actuator that eliminates thrust loads on a drive motor which may otherwise reduce motor life; and a linear actuator device that generates force relatively independent of travel position. The linear actuator is, in part, a low-cost direct current (DC) motor adapted with a threaded shaft mounted into a reference frame which keeps the DC motor case and thus the stator fixed while the threaded shaft rotates.

It is foreseeable that the linear actuator of co-pending patent application Ser. No. 09/829,888 will have an wide variety of applications and be used in demanding environments where operational longevity and reliability may be critical.

SUMMARY OF THE INVENTION

To improve operational longevity and reliability, there is a need for an improved linear actuator device to extend fatigue life, mitigate premature impact failures of actuator stops, and provide a solution to improve maintaining the axial position of a lead screw of the linear actuator on the motor shaft. Additionally, improvements including reducing axial loads on motor shaft bearings and wear of motor armature assemblies are also needed.

The present invention is directed to an improved linear actuator having a retention clutch and an axial load limiter.

An axially configured retention clutch is configured to slidably fit within the open inner channel diameter of an axial load limiter and over a motor shaft of a linear actuator. The retention clutch, axial load limiter and linear actuator comprise the improved linear actuator. The retention clutch decouples the inertia of the motor armature assembly from the screw when the screw stops against stops as the motor shaft is caused to slip in the screw cavity when the screw stops against the translation actuator. In operation, the retention clutch reduces the impact loads on the stop and extending the fatigue life of these wearable components. Similarly, when the screw encounters axial loads during operation, the axial load limiter is arranged to exert a force against the motor housing and these loads are distributed across both the axial load limiter and the motor, thereby reducing direct forces on the motor and contributing to an extended use of the motor component.

The foregoing provides a general outline of certain of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates the torsion spring in an expanded state;

FIG. 3B illustrates the torsion spring in a compressed state;

FIG. 3C is a side cross-section view of an improved DC motor driven linear actuator shown, with a retention clutch and axial load limiter indicating the views in FIGS. 3A and 3B;

DETAILED DESCRIPTION

Figure 1A:
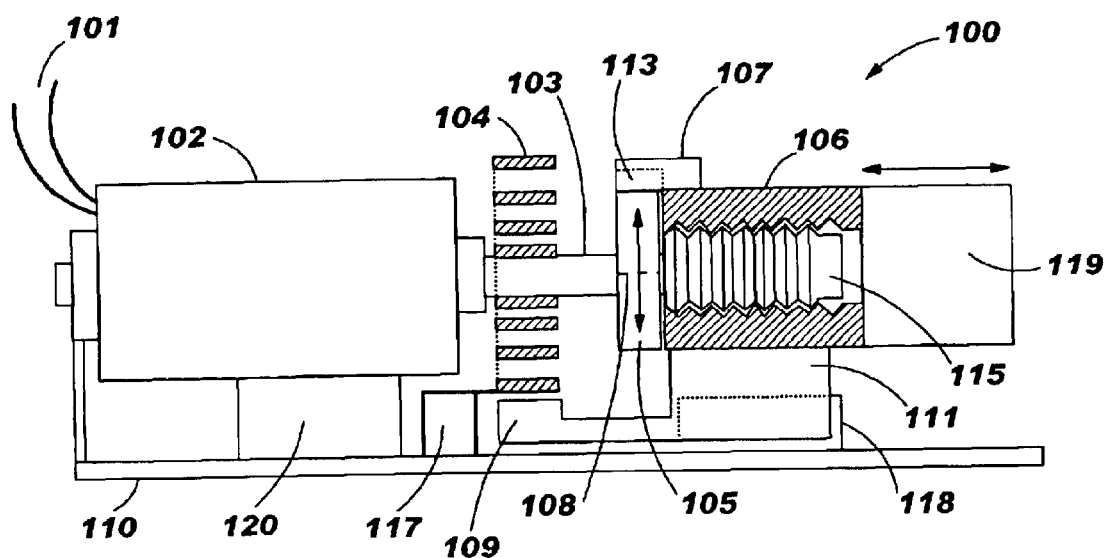
FIG. 1A is a side cross-section view of a DC motor driven linear actuator shown in the retracted position.

In the following description, numerous specific details are set forth to provide a thorough understanding of the present invention. However, it will be obvious to those skilled in the art that the present invention may be practiced without such specific details.

Refer now to the drawings wherein depicted elements are not necessarily shown to scale and wherein like or similar elements are designated by the same reference numeral through the several views.

Figure 1B:
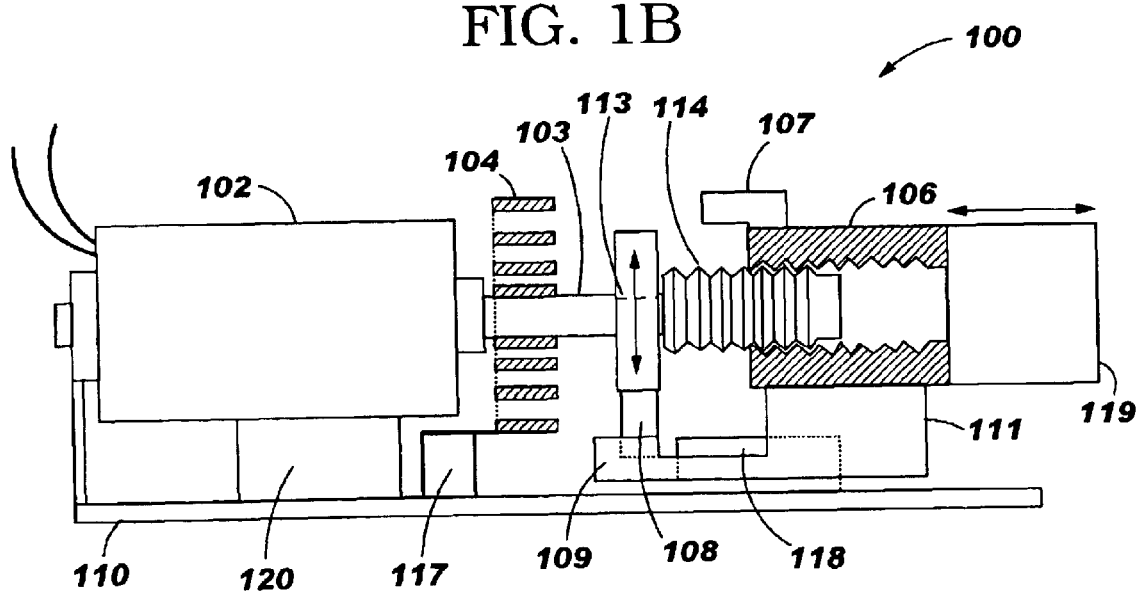
FIG. 1B is a side cross-section view of a DC motor drive linear actuator shown in the extended position.
Figure 1C:
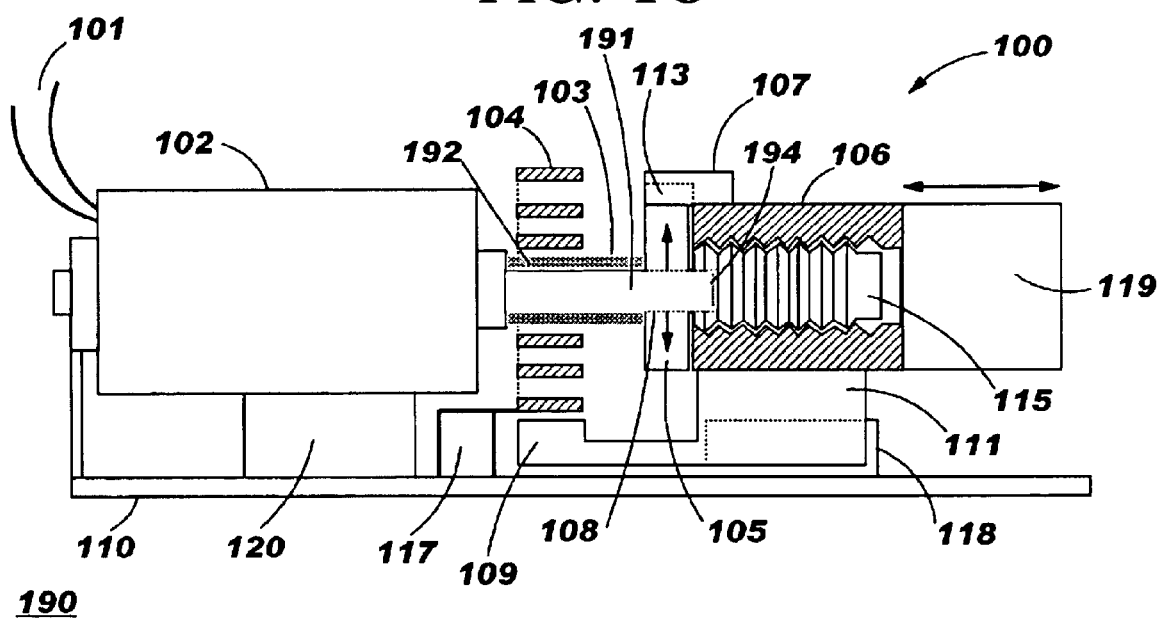
FIG. 1C is a side cross-section view of an improved DC motor driven linear actuator shown, with a retention clutch and axial load limiter, in the retracted position.

FIGS. 1A–1B are diagrams of views of elements of a low-cost DC Motor driven linear actuator. FIG. 1C is a diagram of a view of elements of an improved low-cost DC Motor driven linear actuator, having a retention clutch and an axial load limiter, according to an embodiment of the present invention.

FIG. 1A is a side cross-section view of the linear actuator where the actuator is in a retracted or home position. The linear actuator 100 has a DC motor 102 as the prime driver. DC motor 102 has a shaft 103 coupled to its rotor (not shown). An inner portion of a torsion spring 104 (see FIGS. 2A–2B) is coupled to shaft 103 and an outer portion of torsion spring 104 is attached to frame 110. As shaft 103 is rotated by motor 102, torsion spring 104 stores rotational energy in one direction which is then returned to shaft 103 causing shaft 103 to rotate in the opposite direction when motor 102 is not driven. Shaft 103 is also coupled to threaded shaft 115. Threaded shaft 115 has a threaded portion 114 (see FIG. 1B) and a raised radial portion, shaft stop 105. Shaft stop 105 has a first shaft stop surface 113 and a second shaft stop surface 108. Threaded shaft 115 is threaded to translation actuator 106. Translation actuator 106 laterally translates if it is prevented from rotating as threaded shaft 115 is rotated. Rotation stop 111, of translation actuator 106, engages a guide section 118 of frame 110 which prevents translation actuator 106 from rotating.

Referring back to FIG. 1A, translation actuator 106 has a first actuator stop 107 and a second actuator stop 109. Actuator stop 107 contacts shaft stop surface 113 (refer to FIGS. 2B and 2C for another view) when the translation actuator 106 is in a retracted position. When translation actuator 106 moves to the right, second actuator stop 109 contacts second shaft stop surface 108. These two stops only generate radial loads to the motor 102 (tangential to a radius of shaft 103) and thus do not cause any binding of the threads 114 of the threaded shaft 115 and the translation actuator 106. An extension 119 of translation actuator 106 may be used to contact and move a mechanical load. Wires 101 are used to supply power to motor 102 while frame mount 120 secures the motor 102 to frame 110. Frame portion 117 retains the outer portion of torsion spring 104.

FIG. 1B illustrates linear actuator 100 with translation actuator 106 in an extended position and contacting second actuators stop 108. The second shaft stop surface 108 of threaded shaft 105 contacts actuator stop 109 when in the extended position. Translation actuator 106 is extended by applying power (via wires 101) to DC motor 102 and retracted by stored energy in torsion spring 104 via shaft 103 which reverses motor 102 when power is removed from wires 101. The mating threads 114 of translation actuator 106 are also shown in FIG. 1B.

In a preferred linear actuator, the threaded shaft is secured to the inner portion of a torsional spring. The outer portion of the torsional spring is secured to the reference frame. A translation actuator is threaded onto the threaded shaft and incorporates a first and a second actuator stop. The threaded shaft has a circular raised portion incorporating a first and a second shaft stop surface. The first actuator stop engages the first shaft stop surface which prevents the translation actuator and the threaded shaft from binding when in a retracted position. The second actuator stop engages the second shaft stop surface and prevents the translation actuator and the threaded shaft from binding when in an extended position. An extension of the translation actuator is operable to contact a mechanical load. The first and second actuator stops define the travel of the translation actuator. The reference frame is adapted with an engaging section that contacts a guide portion of the translation actuator to prevent the translation actuator rotation as the threaded shaft is rotated. The engaging section also guides the translation actuator as it linearly moves. Current supplied to the DC motor windings generates torque, dependent only on current amplitude and the DC motor torque constant. The DC motor torque turns the threaded shaft, loads the torsion spring, and drives the translation actuator which linearly translates and moves the mechanical load. When the current to the DC motor is removed, energy stored in the torsion spring rotates the threaded shaft in the reverse direction until the first actuator stop again engages the first shaft stop surface and prevents the translation actuator and shaft threads from binding FIG. 1C illustrates the improved linear actuator 190 comprising the linear actuator 100 with the retention clutch 191 and the axial load limiter 192.

The retention clutch 191 is axially configured and is of a dimensioned diameter to permit the clutch to slidably fit within the open inner channel diameter of the axial load limiter 192. Additionally, the motor shaft 103 further comprises a protruding end 194 having a predetermined protuberance integral thereto, wherein the protuberance is configured to assist in limiting the screw 115 from varying its axial position via insertion of the protruding end into the screw cavity (shown, in part, as 195 as referenced in FIG. 3C) for receiving the end 194. In operation the retention clutch decouples the inertia of the motor armature assembly from the screw when the screw stops against actuator stop 109 and shaft stop 113, as the motor shaft 103 is caused to slip in the screw cavity when the screw 115 stops against the translation actuator 106. In operation, the retention clutch reduces the impact loads on the stop and extending the fatigue life of these wearable components.

The length of the axial load limiter is configured to establish the axial location of the threaded shaft 115 relative to motor 102. Preferably, this length is determined prior to assembly, but may be adjusted post assembly to thereby adjust a resulting gap distance 199. Following assembly, said gap 199 is present as between the motor 102 and axial load limiter 192. In operation, when threaded shaft 115 encounters axial loads during operation, gap 199 reduces in distance, and in certain cirucmstances may collapse, and these loads are distributed across both the axial load limiter and the motor, thereby reducing direct forces on the motor and contributing to an extended use of the motor component.

Figure 2A:
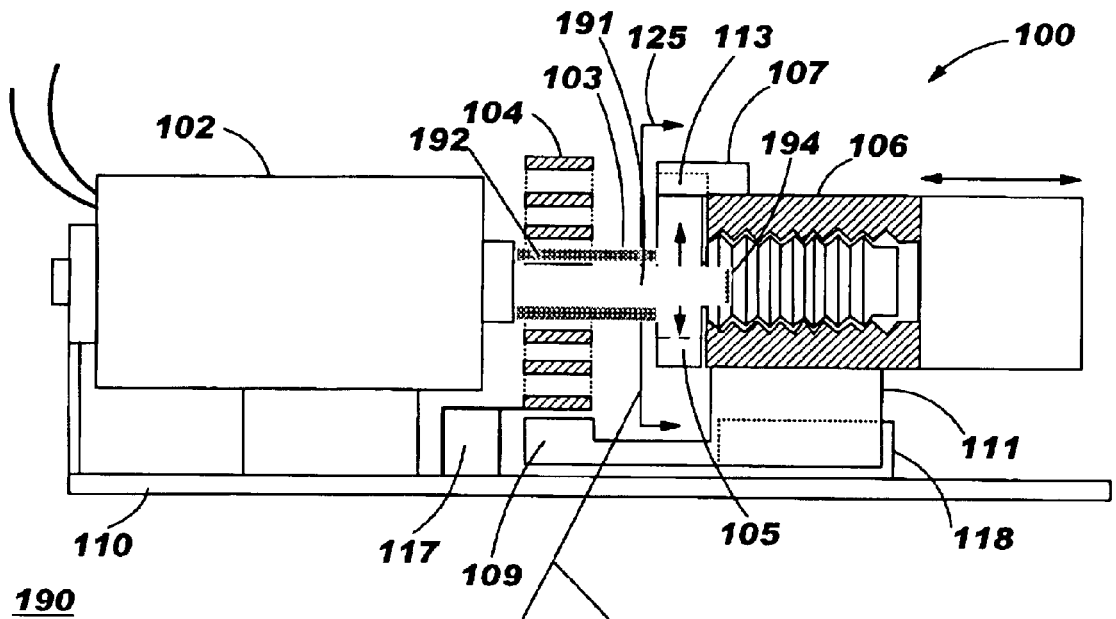
FIG. 2A is a side cross-section view of an improved DC motor driven linear actuator shown, with a retention clutch and axial load limiter, shown in the retracted position with reference view indicated for FIGS. 2B and 2C.
Figure 2B:
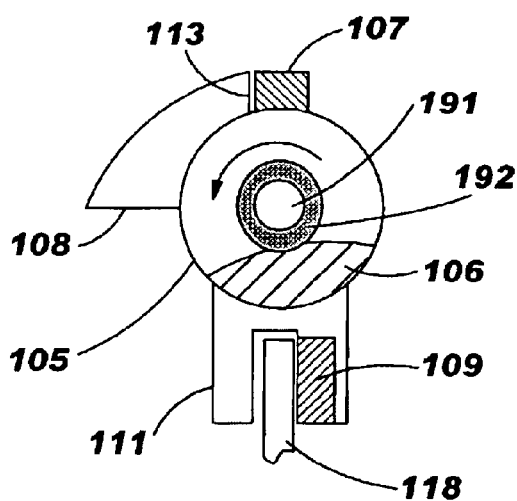
FIG. 2B is a cross-section view of a first actuator stop engaging a first shaft stop surface.
Figure 2C:
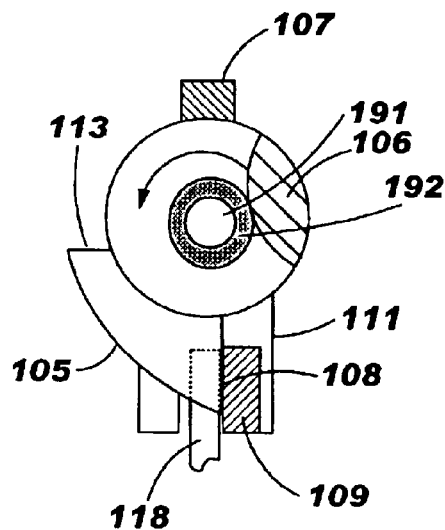
FIG. 2C is a cross-section view of a second actuator stop engaging a second shaft stop surface.

FIG. 2A is a side view of the improved linear actuator 190 according to embodiments of the present invention used to define the view 125 for FIGS. 2B and 2C. In FIG. 2A, the elements of the improved linear actuator 190 are again detailed. DC motor 102 has shaft 103 coupled to torsion spring 104 which is attached to frame 110 with element 117. Retention clutch 191 and axial load limiter 192 are also presented. View reference 125 defines the view for FIGS. 2B and 2C.

FIG. 2B is an end view 125 of shaft stop 105 and elements of translation actuator 106. First shaft stop surface 113 is shown engaging actuator stop 107 when translation actuator 106 is in the retracted position. Rotation stop 118 is shown in a slot in guide 111. Motor shaft 103 is shown in the center of shaft stop 105. A section of shaft stop 105 is shown removed to view a portion of translation actuator 106. Retention clutch 191 and axial load limiter 192 are also presented.

FIG. 2C is another end view 125 (extended position) of shaft 103 and attached shaft stop 105 rotated to the end of a translation move. In this position, translation actuator 106 has moved to the right and second actuator stop 109 has moved under shaft stop 105 so that it engages second shaft stop surface 108. In this position, the portion of shaft stop 105 with first and second shaft stop surfaces 113 and 108 blocks part of the view of rotation stop 118. Depending on the pitch of the threads 114, it may take multiple revolutions of threaded shaft 115 to move from an engagement of first shaft stop surface 113 with first actuator stop 107 until second shaft stop 108 contacts second actuator stop 109. Retention clutch 191 and axial load limiter 192 are also presented.

FIGS. 3A and 3B illustrate views of a preferred embodiment in FIG. 1A with the torsion spring shown in an expanded and a compressed state, respectively. FIG. 3C is another side cross-section view of the improved linear actuator 190 with view lines 206 that indicate the cross-section position for the views of torsion spring 104 shown in FIGS. 3A and 3B (note that the Retention clutch 191 and axial load limiter 192 though present in the improved linear actuator 190 are not diagrammed in FIGS. 3A and 3B). FIG. 3A illustrates torsion spring 104 in an expanded position (little or no stored rotational mechanical energy). Torsion spring 104 has an outer portion attachment 204 to frame 110 with element 117 and an inner portion attachment 203 to shaft 103. FIG. 3B illustrates torsion spring 104 in a compressed position with stored rotational mechanical energy. Inner spring portion 205 is shown wound around shaft 103. The torsion spring 104 is in compression in FIG. 3B and corresponds to the illustration in FIG. 3C with translation actuator 106 extended to where second actuator stop 109 contacts second shaft stop surface 108.

Preferably, in embodiments of the present invention (e.g., FIG. 1A), DC motor 102 is driven by a voltage pulse of sufficient amplitude and duration to generate enough torque to rotate shaft 103 to compress torsion spring 104 and move a mechanical load engaging extended shaft 119. Torsion spring 104 is preferably designed so that its compressed state has enough stored rotational mechanical energy to reverse shaft 103 and return translation actuator 106 so actuator stop 107 contacts shaft stop 113 when the motor drive pulse is removed. Additionally, it is preferred that the axial load limiter 192 be of a molded collar style and be an physical extension of the threaded screw 115.

It is also envisioned that the present inventions could be used in conjunction with and adapted for use in retail point of sale and other similar devices, especially with specific implementation to cash drawers and the like.

For instance a point of sales (POS) terminal may use an improved linear actuator according to embodiments of the present invention. Typically POS terminals have a display, a key entry unit and a strip printer, and a POS housing also often comprises a cash drawer. Typically a cash drawer opens in response to a key entry from a key entry unit where the Open Key signal or trigger signals an electrical voltage pulse which is applied to a DC motor 102 in an improved linear actuator 190. The improved linear actuator 190 then acts upon a mechanical element to allow cash drawer to open for access.

Although the present invention and its advantages have been described in detail, it should be understood that various changes, substitutions and alterations can be made herein without departing from the spirit and scope of the invention as defined by the appended claims.

What is claimed is:

1. An improved linear actuator comprising:
   a direct current (DC) motor having a stator and a rotor, said stator fixed to a reference frame;
   a threaded shaft coupled to said rotor;
   a spring means disposed perpendicular to said axis of said threaded shaft, said spring means comprising a center portion coaxially attached to said threaded shaft and an outer portion attached to said reference frame;
   a translation actuator threadedly coupled to said threaded shaft, said actuator rotationally stopped and operable to laterally translate in response to rotation of said threaded shaft by said DC motor;
   a retention clutch; and
   an axial collar means of a predetermined length positioned between said threaded shaft and said motor to form a gap area.

2. The apparatus of claim 1, wherein said spring means stores rotational energy from DC motor when said DC motor rotates said threaded shaft in a first rotary direction, said spring means returning rotational energy to said shaft in a second rotary direction when said DC motor is un-energized.

3. The apparatus of claim 1, wherein said translation actuator further comprises a portion operable to engage a mechanical load.

4. The apparatus of claim 1, wherein said threaded shaft is coaxially coupled to a rotational shaft stop, said shaft stop having a first and second shaft stop surface.

5. The apparatus of claim 1, said linear actuator further comprises a first and a second actuator stop, said first actuator stop contacting said first shaft stop surface in a first translation position and said second actuator stop contacting said second shaft stop surface at a second translation position, wherein a first and second force resulting from said first and second actuator stops contacting said first and second shaft stop surfaces, respectively, act tangential to a radius vector of said threaded shaft.

6. The apparatus of claim 1, where an application of a drive voltage pulse to said DC motor drives said linear actuator in a first direction until said second actuator stop contacts said second shaft stop surface and removing said drive voltage pulse releases said stored rotational energy in said spring means, said stored rotational energy driving said linear actuator in a second direction until said first actuator contacts said first shaft stop surface.

7. An improved linear translating actuator comprising:
   a direct current (DC) motor having a stator and a rotor, said stator fixed to a reference frame;
   a shaft rotatably coupled to said rotor;
   an energy storing means for storing rotational energy from DC motor when said DC motor rotates said shaft in a first rotary direction, said energy storing means returning rotational energy to said shaft in a second rotary direction when said DC motor is un-energized;
   a conversion means for converting rotation motion of said shaft to an actuator lateral translation motion;
   a retention clutch;
   And an axial collar means of a predetermined length positioned between said threaded shaft and said motor to form a gap area.

8. The apparatus of claim 7, wherein said energy storing means is a torsion spring.

9. The apparatus of claim 7, wherein said shaft is coaxially coupled to a rotational shaft stop, said shaft stop having a first and a second shaft stop surface.

10. The apparatus of claim 9, said linear actuator further comprises a first and a second actuator stop, said first actuator stop contacting said first shaft stop surface in a first translation position and said second actuator stop contacting said second shaft stop surface at a second translation position, wherein a first and second force resulting from said first and second actuator stops contacting said first and second shaft stop surfaces, respectively, act tangential to a radius vector of said threaded shaft.

11. The apparatus of claim 10, where an application of a drive voltage pulse to said DC motor drives said linear actuator until said second actuator stop contacts said second shaft stop surface and removing said drive voltage pulse releases said stored rotational energy in said torsion spring, said stored rotational energy driving said linear actuator until said first actuator contacts said first shaft stop surface.

12. The apparatus of claim 7, wherein said energy storage means comprises a torsion spring, wherein a center portion of said torsion spring is coaxially coupled to said shaft and an outer portion of said torsion spring is coupled to said reference frame.

13. The apparatus of claim 7, wherein said energy storage means comprises a elastic strip having a first and a second end, said elastic strip fixed to said frame at said first end and to said shaft at said second end, said elastic strip wrapping said shaft when said shaft is rotated in said first rotation direction, said elastic strip stretching and thus storing energy.

14. The apparatus of claim 7, wherein said energy storage means comprises a linear spring having a first end and a second end, said linear spring fixed to said frame at said first end and fixed to a inelastic cord at said second end, said inelastic cord wrapping said shaft when said shaft is rotated in said first rotation direction extending said linear spring, said linear spring elongating thus storing energy.

15. The apparatus of claim 7, wherein said conversion means comprises a threaded screw member coupled to said shaft and a rotationally retained actuator, said actuator threadedly coupled to said threaded screw member.

16. The apparatus of claim 7 electromechanically configured to be operative in a POS-type device.

17. The apparatus of claim 1 electromechanically configured to be operative in a POS-type device.

18. The apparatus of claim 1 operationally configurable for use in an electromechanical drawer-type device.

19. A kit for a linear translating actuator comprising a set of:
- a direct current (DC) motor;
- a shaft for rotatably coupling with said motor;
- a spring means for storing rotational energy;
- a retention clutch;
- a conversion means for converting rotation motion of said shaft to an actuator lateral translation motion;
- and an axial collar means having a predetermined length.

20. The kit of claim 19, configured on a linear actuator, wherein said actuator further comprises a stator and a rotor, said stator fixed to a reference frame; and a shaft rotatably coupled to said rotor.

* * * * *